United States Patent [19]

Fujii

[11] 4,308,290

[45] Dec. 29, 1981

[54] METHOD FOR PEELING SHELL FROM BOILED EGGS

[75] Inventor: Noriomi Fujii, Isehara, Japan

[73] Assignee: Q.P. Corporation, Tokyo, Japan

[21] Appl. No.: 148,672

[22] Filed: May 12, 1980

Related U.S. Application Data

[62] Division of Ser. No. 90,899, Nov. 5, 1979.

[51] Int. Cl.$^3$ ................................................ A23L 1/32
[52] U.S. Cl. .................................. 426/299; 426/614; 426/480
[58] Field of Search ....................... 426/299, 614, 480; 99/567, 568, 574, 580

[56] References Cited

U.S. PATENT DOCUMENTS

| | | | |
|---|---|---|---|
| 3,552,458 | 1/1968 | Whitman | 426/299 X |
| 3,764,714 | 10/1973 | Driggs | 426/299 X |
| 3,859,907 | 1/1975 | Hatcher | 426/299 X |
| 3,877,362 | 4/1975 | Epstein | 426/299 X |
| 4,082,856 | 4/1978 | Zwiep et al. | 426/299 |

*Primary Examiner*—Robert A. Yoncoskie

[57] ABSTRACT

Peeling of the shells of boiled eggs is realized continuously, promptly and simply by introducing the boiled eggs into a cylinder through which water is flowing, the cylinder performing circular movememt about a substantially horizontal axis with the magnitude of the circular movement increasing gradually from an initial portion towards a terminal end portion. The boiled eggs are firstly made to collide with the inner surface of the cylinder by small circular movement of the cylinder, and rendered more elastic with the eggshells of fine fragments to the degree that the shell membrane remains unbroken. Next, the shell membrane is broken by applying a whirling water stream and a centrifugal force generated by large circular motion. The boiled egg contents are then separated from the eggshells so smoothly as to be slipped out of their shells.

1 Claim, 4 Drawing Figures

METHOD FOR PEELING SHELL FROM BOILED EGGS

This is a division of application Ser. No. 090,899, filed Nov. 5, 1979.

BACKGROUND OF THE INVENTION

1. Field of the Invention

This invention relates to a method and apparatus for automatically removing the shells of boiled hens' or quails' eggs without injury to the albumen.

2. Description of the Prior Art

Heretofore, a strong demand has been placed on automating the peeling of boiled eggs because especially in restaurants and hospitals, where a large quantity of boiled eggs are consumed, peeling of boiled eggs by manual operation would not be efficient economically. Various proposals have been made so far to meet this demand.

As one of such solutions, it is known to use a rotating tube of hexagonal cross-section or circular cross-section with inner projections into which the boiled eggs are introduced and repeatedly raised and dropped for crushing the shells and separating them from the boiled egg contents. This method has a drawback that the egg shells and shell membrane are broken simultaneously from the outset under a strong force of impact, resulting in an injury to the surface of albumen and a number of rejects. Moreover, part of the broken egg shells may remain on the resulting boiled egg contents, thus necessitating post treatment such as washing with water.

There is also known a method wherein the boiled egg is held by several bars or rods and thereby pressed repeatedly for forming numerous cracks on the shell. The respiratory cell portion of the egg is then broken by a hammer and then water is injected through the cells for floating the remaining shell from the albumen. Thereafter, a resilient member such as a rubber member is pressed against the broken respiratory cell portion of the egg shell, and the boiled egg is pressed on the opposite side for removing the shell from the boiled egg contents. However, this method involves a batch-wise operation and, moreover, manual operation as required in setting the boiled eggs on a device for breaking the respiratory cell portion, thus requiring considerable working hours. In addition, there is the risk that the albumen may be injured during breaking the shell at the respiratory cell portion, thus making it difficult to perform the peeling of a great number of eggs in a short time.

It is also known to pinch the boiled egg between a pair of friction rolls for forming cracks on the shell and then to supply the egg into a water vat for allowing the water to be intruded into a space between the albumen and the shell membrane. Then, the egg is conveyed by a bucket conveyor into a space between a pair of rubber rolls for peeling the shell under the effect of a pressing force and the friction between the rolls. This method is superior to the above two methods in that it provides a fully automated peeling operation, however, there is still the risk that the albumen may be injured because the shell membrane may be broken simultaneously with breaking of the shell.

OBJECT AND SUMMARY OF THE INVENTION

It is therefore a principal object of the present invention to provide a method and an apparatus for continuously peeling of boiled eggs whereby the eggs' shells may be efficiently removed from the boiled eggs without injury to the albumen. For realizing such object, the present invention is directed to a method for continuously peeling the shells of boiled eggs, comprising the steps of introducing boiled eggs into a cylinder through which water is flowing and taking them out from the terminal portion described above, the cylinder performing circular movement about a substantially horizontal axis with the magnitude of the circular movement increasing gradually from an initial portion towards a terminal end portion.

The present is also directed to an apparatus for peeling the shells of boiled eggs comprising
 (a) a cylinder;
 (b) a base;
 (c) a universal support device mounted close to the initial portion of said cylinder and adapted for supporting said cylinder on said base in a manner to permit said cylinder to tilt in any desired direction;
 (d) an eccentric device provided further away towards the terminal end of said cylinder than said universal support device and adapted for supporting said cylinder on said base for imparting to said cylinder a circular movement about a substantially horizontal axis;
 (e) a means for driving said eccentric device; and
 (f) a boiled egg receiver for receiving the boiled egg contents expelled from the terminal end of said cylinder.

DETAILED DESCRIPTION OF PREFERRED EMBODIMENTS

The inventive method and apparatus will be described in detail by referring to preferred embodiments thereof shown in the attached drawings.

Figure 1:
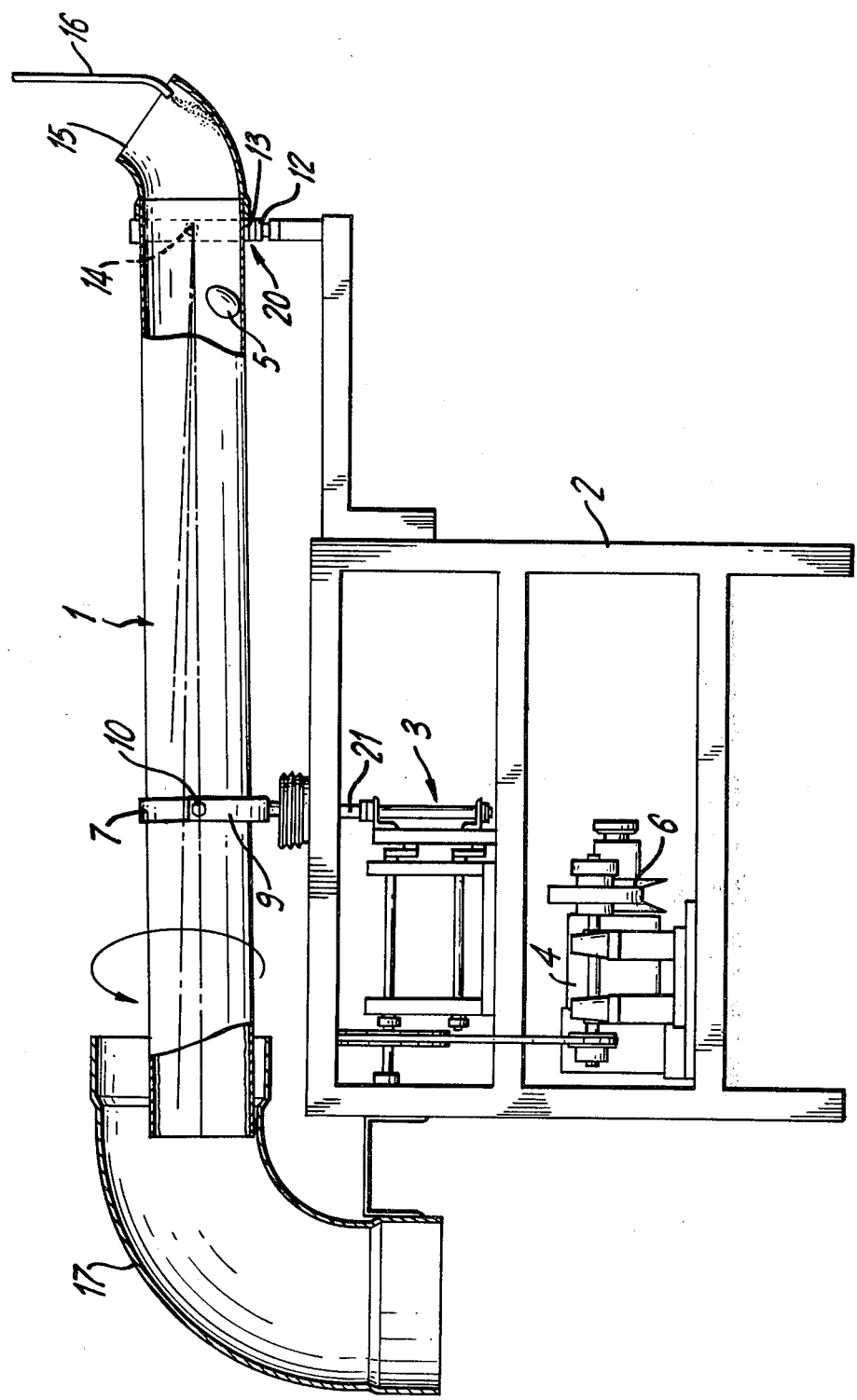
FIG. 1 is a front view of an embodiment of the egg shell peeling device of the present invention, with part being shown in section.
Figure 2:
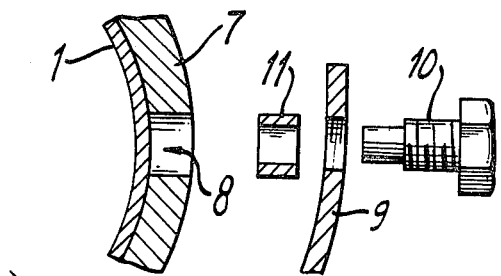
FIG. 2 is an exploded view, partly shown in section, of a fork end of the eccentric device connected to the cylinder.
Figure 3:
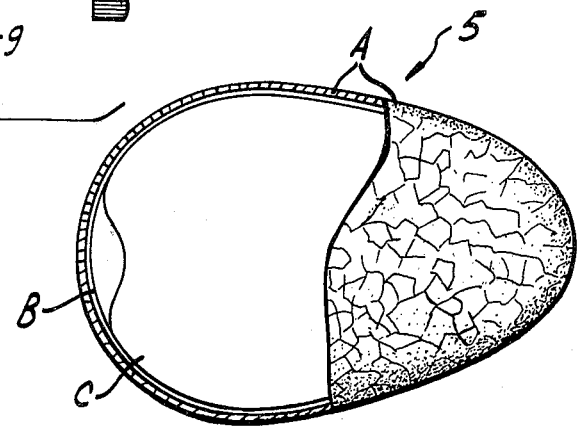
FIG. 3 is a front view of a boiled egg, with part being broken away.
Figure 4:
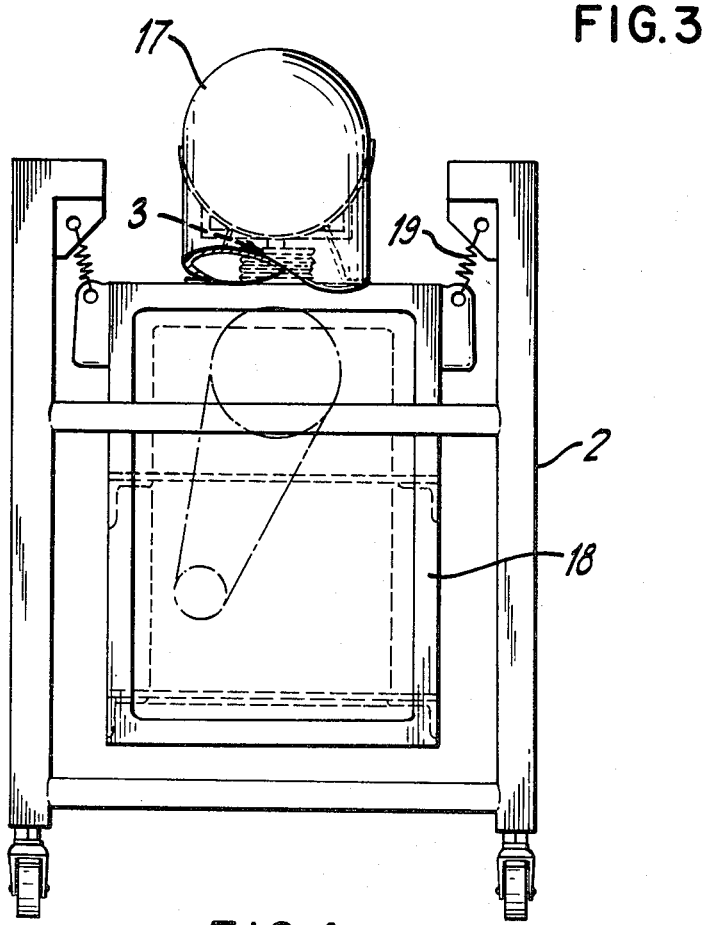
FIG. 4 is a side view showing a modified embodiment of the inventive peeling device.

A cylinder 1 is made of metal or synthetic resin material and has a smooth inner surface. To the initial portion (one end portion) of the cylinder 1, there is attached an inlet duct 15 for boiled eggs to be introduced into the cylinder 1. The inlet duct 15 comprises a bend tube or an elbow tube attached to the cylinder by means of a strap plate 13, as shown in FIG. 1, to permit the boiled eggs to be introduced in succession from the upper end of the tube. As an alternative, the duct 15 may be made integrally with the initial portion of the cylinder by bending the initial portion upwards. A water supply duct 16 is introduced into the inlet duct 15. The duct 16 is used for supplying the water into the cylinder and, to this end, it is connected at the end remote from the duct 15 to a water supply source, such as water works. The initial portion of the cylinder 1 is carried by a support device 20 mounted on a base 2, so as to be rotate about its own axis. The support device 20 comprises a universal joint formed by a fork end 12 mounted on the base 2 for rotation about its vertical axis, said strap plate 13 for the cylinder 1, and a bolt 14 for fastening the fork end 12 and the plate 13 to each other by the intermediary of a rubber bush. The device 20 is adapted for changing the support angle of the cylinder 1 without shifting of the support point. Alternatively, a spherical bearing may be employed as support device.

To the terminal end portion (other end portion) of the cylinder 1, there is provided an egg receiver 17 designed for receiving the boiled eggs 5 upon ejection thereof from the cylinder 1 in a manner to prevent their damage, and for guiding them towards a container provided below the receiver, not shown. It is to be noted that the receiver 17 need not be a 90° elbow secured to the base 2, as shown in FIG. 1, but may also be any other device, such as a cloth barrel mounted to the terminal end portion of the cylinder 1. The cylinder 1 is carried near its terminal end portion by an eccentric device 3 mounted to the base 2. The device 3 has a link mechanism adapted for eccentric rotation for imparting a circular movement to the cylinder 1, and is driven by a drive mortor 4 secured to the lower part of the base 2. As the initial portion of the cylinder 1 is simply supported by the support device 20, the cylinder performs a circular movement, when driven into such movement by the eccentric device 3, with a greater degree of offset or eccentricity from the horizontal axis from the initial portion towards the terminal end portion thereof. By virtue of such circular motion of the cylinder 1, the boiled eggs 5 introduced into the cylinder 1 collide in random against the inner surface of the cylinder 1, and are compelled to follow a helical passage, under the effect of a centrifugal force, with the radii of helices increasing progressively as the eggs approach the terminal end portion of the cylinder 1. By such movement, the eggs are fed forwards, while the shells thereof are broken and peeled, as will be described further. The magnitude and speed of this circular motion can be adjusted suitably as a function of the egg size and hardness of the shell. Thus, the magnitude of the circular motion can be adjusted by changing the setting position of a rod 21 of the eccentric device 3, while the speed can be adjusted through a stepless speed changer 6 mounted between the driving motor 4 and the eccentric device 3.

The eccentric device 3 and the cylinder 1 are connected to each other by, for example, a bolt 10 screwed through both ends of the forked end 9 that are secured in turn to the rod 21 of the eccentric device 3, said bolt 10 being inserted, by the intermediary of a rubber ring 11, into two oversize through-holes 8 in a strap plate 7 secured to the cylinder 1. Thus, any torsional movement between the forked end 9 and the strap plate 7 may be absorbed by resilient deformation of the rubber ring 11, for imparting a smooth motion to the cylinder 1.

The operation of the eccentric device 3 is accompanied by vibration. In order to overcome this problem, the device 3, the driving motor 4 and the speed changer 6 may be mounted on a frame 18 which in its entirety may be suspended from the base 2 through resilient means 19 comprising rubber or spring members adapted for absorbing vibrational impacts. In the drawing, the cylinder is mounted to perform a circular movement about a horizontally rotational axis, however, such is not limitative and the cylinder may be mounted with a slight tilt insofar as the eggs do not drop without impinging on the inner surface of the cylinder and without being subjected to a centrifugal force. Preferably, the cylinder 1 is mounted for performing a circular movement about an axis which may either be horizontal or slightly inclined downwards from the support device 20 towards the terminal end portion of the cylinder.

The method of peeling or removing the shells of the boiled eggs by means of the shell peeling device described above is now explained in detail.

The boiled eggs 5 conveyed by an egg supply conveyor, not shown, are introduced into the cylinder 1 via inlet duct 15. At this time, water is already supplied into the cylinder 1 via supply duct 16. Moreover, as the cylinder 1 is performing a circular movement by the operation of the eccentric device 3, there is formed, on the inner surface of the cylinder 1, a water film moving towards the terminal end portion of the cylinder 1. As the eggs 5 fed into the cylinder 1 are imparted a spiral centrifugal movement due to the circular movement of the cylinder 1, the eggs 5 are brought into random collision, on its numerous surface points, with the inner surface of the cylinder 1. Because of the smaller degree of the circular motion in the vicinity of the cylinder initial portion, the eggs 5 are imparted a less centrifugal motion and, in conjunction with shock-absorbing operation of the water film, the eggs 5 collide against the inner surface of the cylinder with a weaker impact force. Thus, the shell A is broken into small even fragments that are still adhered to the shell membrane B. The eggs 5 are gradually conveyed, by the spiral centrifugal motion, towards the terminal end portion inside the cylinder 1. Because of increasing magnitude of the circular motion of the cylinder 1 towards its terminal end portion, the eggs 5 are brought into more vigorous collision with the inner surface of the cylinder 1. Thus, as the eggs 5 have reached approximately the mid point of the cylinder 1, the shell A is mostly broken into small even pieces or fragments that are still adhered to the shell membrane B. Thus, the shell A has lost its rigidity and can be indented easily by finger pressure. With further increase in magnitude of the centrifugal movement imparted the egg 5, part of the shell membrane B is cracked, and the crack grows in size under the centrifugal movement. By formation of such crack, water may be allowed to intrude into the space between the albumen C and the shell membrane B, the latter being then more liable to peel off from the albumen C. Furthermore, due to application of the centrifugal force and the force to roll the egg about itself, the contents of the egg 5 may ultimately be expelled through the cracked portion of the shell membrane B and may thus be separated from the shell. The egg shell A, thus removed from the egg contents and broken down into small pieces with the shell membrane B adhered thereto, is conveyed by the water supplied into the cylinder 1, and is expelled from the cylinder 1 via the terminal end portion thereof. The contents of the boiled egg 5, imparted a large centrifugal force, is expelled out of the cylinder 1 vigorously through the terminal end portion thereof. However, they are now received by the receiver 17 provided at the terminal end portion of the cylinder and thus may be safeguarded from any injury. Moreover, the egg contents may be classified by taking advantage of the difference in the mass or weight at the time that they are expelled from the cylinder 1.

An experiment was made with 100 boiled eggs by using the present device with the cylinder length equal to 1 m, the inside diameter of the cylinder equal to 12 cm, the amplitude of the circular movement being 8 cm as measured at the terminal end portion of the cylinder, and the rotational speed of the cylinder being 457 RPM. 5 eggs were broken in the albumen, but 93 eggs were free from any injury, and 2 eggs were not subjected to any peeling.

In this way, the egg shell is first broken into small pieces and rendered more resilient to the degree that the shell membrane remains unbroken. As the egg is pressed to the inner surface of the cylinder and is forced to roll inside the cylinder, the shell membrane is subjected to a tensile force resulting in crack formation thus allowing whirling water intrusion and consequent peeling of the shell membrane from the albumen. Thus, the boiled egg contents may be separated from the broken shell so smoothly as to be slipped out. Especially, the separation action described above is performed continuously in the cylinder which is forced to a circular motion gradually increasing the momentum from the initial portion towards the terminal end portion, thus enabling a facilitated shell peeling of a number of boiled eggs at a fast rate. In sum, the shell removed from the boiled egg contents are conveyed by the water stream, while the contents are expelled from the cylinder along a spiral passage under the effect of the centrifugal force, with both of these movements occurring separately and at a relatively fast speed. Thus, by supplying the boiled eggs consecutively from the initial end opening of the cylinder, the shells and the contents may be separately discharged from the receiver at the terminal end of the cylinder, thus enabling a consecutive and highly efficient shell removal of the boiled eggs.

What is claimed is:

1. A method for continuously and consecutively peeling the shells of boiled eggs comprising the steps of:
   (a) continuously and consecutively introducing the boiled eggs into an entry end of a substantially horizontally mounted cylinder capable of eccentric circular movement;
   (b) gyrating said cylinder about a substantially horizontal axis so that the eccentric circular movement of said cylinder increases from said entry end to the exit end;
   (c) impacting said eggs against the sides of said cylinder by said gyratory motion to crack and loosen the shells from the eggs;
   (d) flushing the eggs through said cylinder with water into a receiving and separating vessel;
   (e) peeling and separating the loosened peels from the eggs by the flushing water in said separating vessel.

* * * * *